United States Patent [19]

Günter

[11] 4,431,689

[45] Feb. 14, 1984

[54] PROCESS FOR COATING A SUBSTRATE AND A LIQUID AQUEOUS COATING COMPOSITION TO BE USED THEREIN

[75] Inventor: Gerhard Günter, Ettlingen, Fed. Rep. of Germany

[73] Assignee: Akzo N.V., Arnhem, Netherlands

[21] Appl. No.: 380,839

[22] Filed: May 21, 1982

[30] Foreign Application Priority Data

May 22, 1981 [NL] Netherlands ........................ 8102516

[51] Int. Cl.$^3$ ........................................... B05D 3/02
[52] U.S. Cl. ................................... 427/388.2; 427/27; 427/385.5; 427/388.4; 427/393.5; 427/386; 523/406; 523/408; 525/121; 525/122
[58] Field of Search ............... 525/121, 122; 523/406, 523/408; 427/27, 420, 422, 429, 385.5, 393.5, 388.2, 388.4

[56] References Cited

U.S. PATENT DOCUMENTS

| | | | |
|---|---|---|---|
| 2,794,010 | 5/1957 | Jackson | 523/406 X |
| 3,234,165 | 2/1966 | Hayes | 523/406 |
| 4,069,186 | 1/1978 | Ramig | 524/524 X |
| 4,239,799 | 12/1980 | Weinberg et al. | 523/408 X |
| 4,356,277 | 10/1982 | Birkmeyer | 523/406 |

FOREIGN PATENT DOCUMENTS

51/81830  7/1976  Japan .............................. 523/408 X

*Primary Examiner*—Thurman K. Page
*Attorney, Agent, or Firm*—Stevens, Davis, Miller, Mosher

[57] ABSTRACT

A process is provided for coating a substrate by applying to a substrate an aqueous coating composition that comprises (a) an aqueous dispersion of a film forming polymer having a minimum film forming temperature not higher than 45° C.; (b) a solid, particulate polymer having a softening temperature in the range of 45° to 260° C. and an average particle size in the range of 2 to 400 μm and (c) a solid, rubberlike polymer having an average particle size in the range of 1 to 500 μm, the resulting coating being cured at a temperature of 70°–260° C. The invention also relates to the liquid aqueous coating composition to be used in said process.

12 Claims, No Drawings

PROCESS FOR COATING A SUBSTRATE AND A LIQUID AQUEOUS COATING COMPOSITION TO BE USED THEREIN

The invention relates to a process for coating a substrate by applying an aqueous coating composition to a substrate and subsequently baking the composition. The coating composition is suitable for industrial use, more particularly for the automobile sector, for instance as an excellent protective coating against damage by road metal. The coating composition is little viscous, in spite of its high solids content, displays rapid physical drying because of the evaporation of water and does not give rise to air pollution because there is no need for it to contain organic solvents. An additional advantage to the absence of organic solvents is that as a result they can no longer cause a polymer such as an epoxy resin to solvate or swell, which leads to agglomeration of solid polymeric particles. Besides, the coating composition is easy to apply and makes it possible to obtain surfaces without irregularities, such as cracks or blisters, in the coating film.

An important advantage to the present coating composition consists in that when it is used as a means of protecting a substrate from damage by road metal it may serve as a substituent for the usual plasticizer-containing plastisols and organosols based on polyvinyl chloride. These last-mentioned compositions have the disadvantage that their use gives rise to a high degree of air pollution as a result of the release of the plasticizers and suchlike compounds and moreover to deposition of a very sticky material which may be harmful to operating personnel and is difficult to remove. Another advantage of the present, aqueous coating composition is that while offering the same protection as the usual polyvinyl chloride-containing plastisols and organosols, it may be applied in a considerably smaller layer thickness. A further advantage is that the coating composition displays improved resistance to corrosion and has a sound damping effect. Other advantages will be mentioned hereinafter.

The process according to the invention is characterized in that the aqueous coating composition contains a binder which per 100 parts by weight is composed of:

(a) 1–98 parts by weight of an aqueous dispersion of a film forming polymer having a minimum film forming temperature not higher than 45° C.;
(b) 1–98 parts by weight of a solid, particulate polymer having a softening temperature in the range of 45° to 260° C. and an average particle size in the range of 2 to 400 μm, and of
(c) 1–95 parts by weight of a solid, rubberlike polymer having an average particle size in the range of 1 to 500 μm, the parts by weight being calculated on the polymers without water or an organic solvent, the baking taking place at a temperature above the softening point of said solid, particulate polymer and in the range of 70° to 260° C.

It should be noted that U.S. Pat. No. 4,069,186 pertains to an opacified latex dispersion paint that comprises a film-forming latex binder and a non-film-forming plastic pigment polymer that has a weighted average diameter of at most 1 μm and does not melt at the drying or curing temperature used. The process disclosed, however, does not provide for the use of a solid, rubberlike polymer in the opacified paint. Nor do the optical properties envisaged by it have any relationship to those of the present coating composition.

Representative aqueous dispersions of a film forming polymer include the dispersions of a homopolymer or copolymer of a diolefine such as 1,3-butadiene, cyclobutadiene and/or isoprene, and possibly a vinyl aromatic compound such as styrene, α-methyl styrene and/or one or more other ethylenically unsaturated monomers. Examples of other suitable dispersions include those that are based on polyacrylate, a polyvinyl acetate, a polyvinyl chloride or a polyurethane. Alternatively, the polymers may of course be built up in a known and usual way from comonomers other than the ones mentioned before and containing OH—, $NH_2$— or COOH-groups or not. The polyvinyl acetate, for instance, may be built up from comonomers such as butyl acrylate, octyl acrylate, dibutyl fumarate, dioctyl maleate, vinyl propionate and/or vinyl capronate. The polyacrylate, for instance, may be built up from one or more alkyl acrylates and/or alkyl methacrylates and from, for instance, comonomers such as vinyl acetate and/or styrene. The above-envisaged dispersions, which are also referred to as latices, and the preparation thereof are known to a man skilled in the art and need not be further described here. It is preferred that the polymer should have a minimum film forming temperature in the range of −25° to 35° C., more particularly in the range of 0° to 25° C.

A representative example of the solid, particulate polymer to be used according to the invention is the solid, thermoplastic epoxy group-containing compound generally containing 1, but preferably 2 or more epoxy groups per molecule. For brevity, the epoxy group-containing compound is referred to hereinafter as epoxy resin. Examples of suitable solid epoxy resins include epoxy groups-containing resins such as polyacryl resins, polyesters, polyethers or polyurethanes which all contain one or more epoxy groups per molecule. Preferably, resins containing 2 or more glycidyl groups per molecule are employed as the epoxy resin. More particularly it is preferred that the epoxy resin used should be a compound of the following general formula:

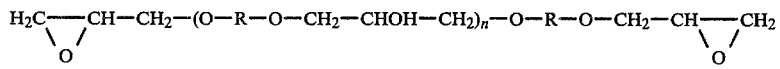

wherein R represents an aliphatic, cycloaliphatic or aromatic group and n is a number within the range of from 0 to 150, preferably between 0 and 60. As examples of such epoxy resins may be mentioned the glycidyl ethers of ethylene glycol, diethylene glycol, triethylene glycol, 1,2-propylene glycol, 1,3-propylene glycol, 1,5-pentane diol, bis-(4-hydroxycyclohexyl)-2,2-propane, 4,4′-dihydroxybenzophenone, bis-(4-hydroxyphenyl)-methane, bis-(4-hydroxyphenyl)-1,1-ethane, bis-(4-hydroxyphenyl)-1,1-isobutane and 1,5-dihydroxynaphthalene. Optionally, use may be made of polyglycidyl ethers of compounds such as glycerol or 1,2,6-hexane triol. More particularly, preference is given to the use of a diglycidyl ether based on bis-(4-hydroxyphenyl)-2,2-propane. Also mixtures of epoxy resins may be employed. The epoxy equivalent weight of the epoxy resin(s) is by preference 600–2000, more particularly 800–1500. Preferably, the epoxy resin has a number average molecular weight in the range of 1000 to 15000.

In addition to or instead of the solid thermoplastic epoxy resin, use may be made of other solid thermoplastic polymers such as a polyester or a polyamide or self-curable polymers. The solid particulate polymer has a softening temperature between 45° C. and the baking temperature, which is in the range of 70° to 260° C. and preferably between 100° C. and 180° C. It is preferred that the softening temperature should be in the range of 70° to 170° C., more particularly in the range of 75° to 130° C. The average particle size of the powdered, particulate polymer is generally in the range of 2 to 400 μm, preferably 10 to 150 μm.

The third component which according to the invention is to be contained in the binder is a solid, rubberlike polymer having an average particle size in the range of 1 to 500 μm, preferably in the range of 5 to 350 μm.

Examples of suitable rubberlike polymers include natural rubber, polyisoprene, a butyl rubber and the rubberlike copolymers of 1,3-butadiene, acrylonitrile and, if desired, other monomers, the copolymers of styrene and 1,3-butadiene and, if desired, other monomers and the copolymers of ethylene, another α-alkylene such as propylene or a butylene, and optionally a polyunsaturated compound such as dicyclopentadiene and/or 5-ethylidene norbornene-2. Very suitable for use are mixtures of various rubberlike polymers. As known to a man skilled in the art, the rubberlike properties of these polymers are obtained by vulcanization or cross-linking, for instance by means of sulphur and vulcanization accelerators and/or with a peroxide. An example of another suitable rubber type is a block polymer of, for instance, styrene and 1,3-butadiene. It is preferred, however, that as rubberlike polymer there should be employed a recycled scrap rubber recovered from rubber objects such as automobile tyres or conveyor belts. Recycled rubber, of course, contains the usual additives, such as fillers, for instance: carbon black and/or silica, which however does not give any difficulty in the use of the rubber in the present coating composition. On the contrary, the use of such a rubber will reduce the waste problem caused by, say, discarded automobile tyres. Also as a starting material for preparing the powdered, rubberlike polymer, however, may serve block rubbers, which may or may not contain a pigment and/or a filler.

The aqueous coating composition may be prepared from the aqueous dispersion of the film forming polymer, the solid, particulate polymer and the rubberlike polymer in any convenient manner. Further, it may contain the usual additives, for instance: pigments, powdered fillers, fibres, levelling agents, antifoaming agents, dispersing agents, emulsifying agents, agents influencing rheology, stabilizers, corrosion inhibitors, fungicides, vulcanization accelerators, sulphur, radical initiators, acid or basic compounds for controlling the pH, organic solvents, and curing agents, for instance: water-soluble or water-dispersible amino resins, such as urea formaldehyde resins or melamine formaldehyde resins, and acidblocked polyamines and/or polyaminoamides. Moreover, the solid, particulate polymer may have been previously mixed with, for instance, one or more pigments, a cross-linking agent such as dicyandiamide, a melamine resin and/or a blocked polyisocyanate or polyisocyanate. Optioally, also coalescing agents may be present. But of these compounds it is known that they generally cause the minimum film forming temperature to decrease. Therefore, the minimum film forming temperature of the starting polymer may be chosen higher, so that the final value of the minimum film forming temperature falls within the limits according to the invention.

The invention also relates to an aqueous coating composition which is characterized in that it contains a binder which per 100 parts by weight is composed of:
(a) 1–98 parts by weight of an aqueous dispersion of a film forming polymer having a minimum film forming temperature not higher than 45° C.;
(b) 1–98 parts by weight of a solid, particulate polymer having a softening temperature in the range of 45° to 260° C. and an average particle size in the range of 2 to 400 μm, and of
(c) 1–95 parts by weight of a solid, rubberlike polymer having an average particle size in the range of 1 to 500 μm, the parts by weight being calculated on the polymers without water or an organic solvent. It is preferred that use should be made of a binder which per 100 parts by weight is composed of: (a) 15–65 parts by weight of the aqueous dispersion of the film forming polymer; (b) 5–40 parts by weight of the solid, particulate polymer, and of (c) 15–64 parts by weight of the solid, rubberlike polymer, the parts by weight being calculated on the polymers without water or an organic solvent.

The coating composition may be applied to the substrate in any convenient manner, for instance by roller coating, spraying, brushing, sprinkling, flow coating, dipping or electrostatic spraying. It is preferred that the coating composition should be applied by spraying. The substrate may be of a synthetic material, such as polyethylene, polypropylene, polycarbonate, polyoxymethylene, polyamide, polyester or acrylonitrile-butadiene-styrene copolymer, but is preferably of a metal, for instance: iron, steel, zinc or aluminium. Optionally, the substrate may be pretreated.

After the coating composition has been applied to the substrate, it may first dry somewhat at ambient or slightly elevated temperature, followed by heating the substrate to a temperature in excess of the softening temperature of the thermoplastic polymer used. This has the advantage that for this heating use may be made of the oven which is being employed for curing the top coating system. For upon being heated, the present composition does not release any harmful substances. In this way a better, energy saving use of heat is made.

The invention will be further illustrated but not limited by the following examples. In them the viscosity was measured in a rotational viscometer (Rheomat 30) at a shear stress of $489s^{-1}$ and expressed in mPas. The solids content was determined in accordance with DIN 55945/1. The Erichsen identation value was determined in accordance with DIN 53156 and expressed in mm. The resistance to corrosion was determined by carrying out the salt spray test over an exposure period of 480 hours in accordance with DIN 50021. The panels subjected to this test were rated for resistance to corrosion on a 0 to 5 scale, where 0 is excellent and 5 is poor. Further, the coated panels were subjected to a high humidity test over a period of 168 hours in accordance with DIN 50017. The road metal exposure test was carried out by blasting the panel 20×, use being made each time of 500 g of steel grit, a pressure of 3 bar and a distance of 40 to 50 cm between the pistol nozzle and the panel. Indicated is the degree to which the coating is blasted off. The coatings of the invention are resistant to petrol and are very elastic. They do not display cracks after 14 days' continuously successive exposure of the panels alternately to a temperature of −40° C. for 24 hours and to a temperature of +70° C. for 24 hours, not even after artificial aging at elevated temperature. By parts are to be understood here parts by weight.

COMPARATIVE EXAMPLE

A coating composition was prepared by intermixing 52.6 parts of a polyacrylate dispersion (marketed by BASF under the trade name Acronal 290 D), 40.5 parts of a powdered rubber having a particle size less than 150 µm (marketed by Hewo under the trade name 0003 K), 5 parts of talc, 0.4 parts of an Na-polyacrylate as thickener (available under the trade name Latekoll D), 0.2 parts of ammonium hydroxide and 1.3 parts of softened water. The composition, which had a solids content of 72.3% and a viscosity of 2025 mPas was applied to a steel panel by brush to a coating thickness of 200 µm (in the dried state). The coating was allowed to harden at room temperature. The measured properties of the coating obtained are mentioned in the Table below.

EXAMPLE 1

A coating composition was prepared by mixing 50.6 parts of a styrene-butadiene latex having a minimum film forming temperature of about 0° C. (weight ratio of styrene to butadiene is 1:1; soilds content is 50% by weight; marketed by Hüls under the trade name Litex CA), 12.9 parts of a solid glycidyl ether of Bisphenol A having a number average molecular weight of 1400, a softening temperature of 90°–100° C. and an average particle size of 40–50 µm (marketed by Shell under the trade name Epikote 1004), 34.4 parts of a powdered automobile tyre rubber (marketed by Hewo under the trade name 003 K), 1.1 parts of an anti-foaming agent, 0.25 parts of an Na-polyacrylate as thickener (available under the trade name Latekoll D), 0.1 part of ammonium hydroxide and 0.65 parts of softened water. The composition, which had a solids content of 73.9% and a viscosity of 1526 mPas, was applied to a steel panel to a coating thickness of 500 µm (in the dried state) by means of a compressed air gun. The coating was cured for 15 minutes at a temperature of 130° to 140° C. The measured properties of the resulting coating are mentioned in the Table below.

EXAMPLE 2

A coating composition was prepared by mixing 30.0 parts of the same styrene-butadiene latex as mentioned in Example 1, 10 parts of an aliphatic polyurethane dispersion having a minimum film forming temperature of about 0° C. (available under the trade name NeoRez R 974), 15 parts of the epoxy resin as mentioned in Example 1, 5 parts of an aromatic polyisocyanate blocked with phenol (available under the trade name Desmodur AP Stabil), 20 parts of a powdered butyl rubber having a particle size less than 20 µm (available under the trade name EP 0005 R1), 2 parts of ethyl glycol ether and 18 parts of softened water. The composition, which had a solids content of 59% and a viscosity of 650 mPas, was applied to a steel panel to a coating thickness of 250 µm (in the dried state) by flow coating. The coating was cured for 20 minutes at a temperature of 170° C. The measured properties of the resulting coating are mentioned in the Table below.

EXAMPLE 3

A coating composition was prepared by mixing 50 parts of styrene-butadiene latex as mentioned in Example 1, 13.2 parts of the epoxy resin as mentioned in Example 1, 32 parts of the rubber as mentioned in the Comparative Example, 1.8 parts of zinc oxide, 0.09 parts of sulphur, 0.09 parts of zinc diethyl dithiocarbamate, 0.18 parts of a vulcanization accelerator (available under the trade name Vultamol), 1.0 part of an anti-foaming agent (available under the trade name Byk VP 020), 0.3 parts of a thickener as mentioned in Example 1, 0.15 parts of ammonium hydroxide and 1.18 parts of softened water. The composition, which had a solids content of 73.6% and a viscosity of 1980 mPas, was applied to a steel panel to a coating thickness of 400 µm (in the dried state) with the aid of a compressed air gun. The coating was cured for 15 minutes at a temperature of 140° C. The measured properties of the resulting coating are given in the Table below.

EXAMPLE 4

A coating composition was prepared by mixing 35 parts of the aqueous styrene-butadiene latex as mentioned in Example 1, 8 parts of the aqueous polyurethane dispersion as mentioned in Example 2, 12.0 parts of the epoxy resin as mentioned in Example 1, 23 parts of the powdered rubber as mentioned in Example 2, 1 part of an anti-foaming agent (available under the trade name Additol XW 395), 3.8 parts of the blocked polyisocyanate as mentioned in Example 2 and 17.2 parts of softened water. The composition, which had a solids content of 60.5% and a viscosity of 690 mPas, was applied electrostatically to a steel panel in a coating thickness of 60 µm (in the dried state). The coating was cured for 20 minutes at a temperature of 170° C. The measured properties of the resulting coating are given in the Table below.

TABLE

| Properties | Examples | | | | Comparative Example |
|---|---|---|---|---|---|
| | 1 | 2 | 3 | 4 | |
| Erichsen indentation value | 10 | 6 | 9 | 8 | 10 |
| Resistance to corrosion | 0 | 2 | 2 | 2 | 3–4 |
| High humidity test | 0 | 1 | 2 | 1–2 | 2 |
| Road metal test | 0 | 4 | 0 | 3 | 5 |

I claim:
1. A process for coating a metal or synthetic polymer substrate by applying an aqueous coating composition to said substrate and subsequently baking the composition, characterized in that the aqueous coating composition contains a binder which per 100 parts by weight is composed of:
   a. 1–98 parts by weight of an aqueous dispersion of a film forming polymer having a minimum film forming temperature not higher than 45° C.;
   b. 1–98 parts by weight of a solid, particulate polymer having a softening temperature in the range of 45° to 260° C. and an average particle size in the range of 2 to 400 µm, and
   c. 1–95 parts by weight of a solid, rubberlike polymer having an average particle size in the range of 1 to 500 µm, the parts by weight being calculated on the polymers without water or an organic solvent, the baking taking place at a temperature above the softening point of said solid, particulate polymer and in the range of 70° to 260° C.;
said solid, rubberlike polymer (c) being selected from the class consisting of natural rubber, polyisoprene, a butyl rubber and the rubberlike copolymers of 1,3-butadiene, acrylonitrile or other monomers copolymerizable therewith, copolymers of styrene and 1,3-butadiene or other monomers copolymerizable therewith, and copolymers of ethylene, another α-alkylene such as propylene or a butylene, and a polyunsaturated compound such as dicyclopentadiene and/or 5-ethylidene norbornene-2, and mixtures thereof.

2. The process of claim 1, wherein the aqueous dispersion is a dispersion of a homopolymer or a copolymer of a diolefine selected from the class consisting of 1,3-butadiene, cyclobutadiene and isoprene, and a vinyl aromatic compound selected from the class consisting of styrene and α-methyl styrene.

3. The process of claim 1 or 2, wherein the aqueous dispersion has a minimum film forming temperature in the range of $-25°$ to 35° C.

4. The process of claim 3, wherein the aqueous dispersion has a minimum film forming temperature in the range of 0° to 25° C.

5. The process of claim 1, wherein the solid, particulate polymer is a solid, thermoplastic epoxy resin of the general formula

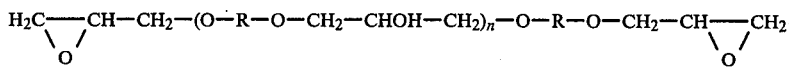

wherein R represents an aliphatic, cycloaliphatic or aromatic group and n is a number within the range of from 0 to 150, preferably between 0 and 60.

6. The process of claim 1, wherein the solid, particulate polymer has a softening temperature between 70° C. and 170° C.

7. The process of claim 1, wherein the solid, particulate polymer has an average particulate size in the range of 10 to 150 μm.

8. The process of claim 1, wherein the solid, rubberlike polymer is a recycled scrap rubber recovered from automobile tyres or conveyor belts.

9. The process of claim 1, wherein the solid, rubberlike polymer has an average particle size in the range of 5 to 350 μm.

10. The process of claim 1, wherein the baking takes place at a temperature in the range of 100° to 180° C.

11. An aqueous coating composition containing a binder which per 100 parts by weight is composed of:
 a. 1–98 parts by weight of an aqueous dispersion of a film forming polymer having a minimum film forming temperature not higher than 45° C.;
 b. 1–98 parts by weight of a solid, particulate polymer having a softening temperature in the range of 45° to 260° C. and an average particle size in the range of 2 to 400 μm, and
 c. 1–95 parts by weight of a solid, rubberlike polymer having an average particle said in the range of 1 to 500 μm, the parts by weight being calculated on the polymers without water or an organic solvent;
said solid, rubberlike polymer (c) being selected from the class consisting of natural rubber, polyisoprene, a butyl rubber and the rubberlike copolymers of 1,3-butadiene, acrylonitrile or other monomers copolymerizable therewith, copolymers of styrene and 1,3-butadiene or other monomers copolymerizable therewith, and copolymers of ethylene, another α-alkylene such as propylene or a butylene, and a polyunsaturated compound such as dicyclopentadiene and/or 5-ethylidene norbornene-2, and mixtures thereof.

12. The aqueous coating composition of claim 11 characterized in that per 100 parts by weight the binder is composed of: (a) 15–65 parts by weight of the aqueous dispersion of the film forming polymer; (b) 5–40 parts by weight of the solid, particulate polymer, and of (c) 15–65 parts by weight of the solid, rubberlike polymer, the parts by weight being calculated on the polymers without water or an organic solvent.

* * * * *